(12) United States Patent
Gordon et al.

(10) Patent No.: US 9,481,367 B1
(45) Date of Patent: Nov. 1, 2016

(54) AUTOMATED CONTROL OF INTERACTIONS BETWEEN SELF-DRIVING VEHICLES AND ANIMALS

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/883,058

(22) Filed: Oct. 14, 2015

(51) Int. Cl.
*B60W 50/16* (2012.01)
*B60W 30/09* (2012.01)
(Continued)

(52) U.S. Cl.
CPC .............. *B60W 30/09* (2013.01); *B60W 10/04* (2013.01); *B60W 10/18* (2013.01); *B60W 10/20* (2013.01); *B60W 10/30* (2013.01); *B60W 30/0956* (2013.01); *G05D 1/0088* (2013.01); *H04N 7/183* (2013.01); *B60W 2420/42* (2013.01); *B60W 2710/081* (2013.01); *B60W 2710/18* (2013.01);
(Continued)

(58) Field of Classification Search
CPC .... B60W 30/09; B60W 10/18; B60W 10/20; B60W 10/04; B60W 30/0956; B60W 10/30; B60W 2420/42; B60W 2410/081; B60W 2710/18; B60W 2710/20; B60W 2710/30; B60W 2720/10; H04N 7/183; G05D 1/0088
See application file for complete search history.

(56) References Cited

U.S. PATENT DOCUMENTS 5,975,791 A    11/1999  McCulloch
6,064,970 A     5/2000  McMillan et al.
(Continued)

FOREIGN PATENT DOCUMENTS

CN         1135063     11/1996
CN        202012052    10/2011
(Continued)

OTHER PUBLICATIONS

P. Mell et al., "The NIST Definition of Cloud Computing", National Institute of Standards and Technology, Information Technology Laboratory, Sep. 2011, pp. 1-7.
X. Jardin, "Terrifying dashcam video captures distracted teen drivers crashing while goofing off", Boing Boing, www.boingboing.net, Mar. 26, 2015, 1 page.
(Continued)

*Primary Examiner* — Yuen Wong
(74) *Attorney, Agent, or Firm* — Law Office of Jim Boice

(57) ABSTRACT

A computer-implemented method causes a self-driving vehicle (SDV) to avoid a physical encounter with an animal. One or more sensors on a self-driving vehicle (SDV) capture a description of an environment around an animal that the SDV is approaching. A camera captures an image of the animal that the SDV is approaching. An SDV on-board computer on the SDV determines an animal type of the animal based on the captured image of the animal, and then predicts a direction and speed of movement of the animal based on the animal type of the animal and the captured description of the environment of the animal. The SDV on-board computer then determines a probability of a physical encounter between the SDV and the animal, and adjusts the speed and direction of the SDV accordingly in order to reduce a likelihood of the SDV striking the animal.

17 Claims, 8 Drawing Sheets

(51) Int. Cl.
*H04N 7/18* (2006.01)
*G05D 1/00* (2006.01)
*B60W 10/18* (2012.01)
*B60W 10/20* (2006.01)
*B60W 10/04* (2006.01)
*B60W 30/095* (2012.01)
*B60W 10/30* (2006.01)

(52) U.S. Cl.
CPC ...... *B60W 2710/20* (2013.01); *B60W 2710/30* (2013.01); *B60W 2720/10* (2013.01)

(56) References Cited

U.S. PATENT DOCUMENTS

| | | |
|---|---|---|
| 6,326,903 B1 | 12/2001 | Gross et al. |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 7,124,088 B2 | 10/2006 | Bauer et al. |
| 7,877,269 B2 | 1/2011 | Bauer et al. |
| 7,894,951 B2 | 2/2011 | Norris et al. |
| 8,031,062 B2 | 10/2011 | Smith |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,180,322 B2 | 5/2012 | Nakae et al. |
| 8,489,434 B1 | 7/2013 | Otis et al. |
| 8,509,982 B2 | 8/2013 | Montemerlo et al. |
| 8,660,734 B2 | 2/2014 | Zhu et al. |
| 8,676,466 B2 | 3/2014 | Mudalige |
| 8,793,046 B2 | 7/2014 | Lombrozo et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,305,411 B2 | 4/2016 | Ricci |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0200379 A1 | 9/2006 | Biet |
| 2007/0100687 A1 | 5/2007 | Yoshikawa |
| 2008/0048850 A1 | 2/2008 | Yamada |
| 2009/0248231 A1 | 10/2009 | Kamiya |
| 2010/0179720 A1 | 7/2010 | Lin et al. |
| 2012/0277947 A1 | 11/2012 | Boehringer et al. |
| 2013/0030657 A1 | 1/2013 | Chatterjee et al. |
| 2013/0261871 A1 | 10/2013 | Hobbs et al. |
| 2014/0095214 A1 | 4/2014 | Mathe et al. |
| 2014/0129073 A1 | 5/2014 | Ferguson |
| 2014/0136045 A1* | 5/2014 | Zhu ..................... G05D 1/0214 701/23 |
| 2014/0188999 A1 | 7/2014 | Leonard et al. |
| 2014/0195213 A1 | 7/2014 | Kozloski et al. |
| 2014/0214255 A1 | 7/2014 | Dolgov et al. |
| 2014/0222277 A1 | 8/2014 | Tsimhoni et al. |
| 2014/0297116 A1 | 10/2014 | Anderson et al. |
| 2014/0310186 A1 | 10/2014 | Ricci |
| 2014/0324268 A1 | 10/2014 | Montemerlo et al. |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0035685 A1 | 2/2015 | Strickland et al. |
| 2015/0051778 A1 | 2/2015 | Mueller |
| 2015/0066284 A1 | 3/2015 | Yopp |
| 2015/0095190 A1 | 4/2015 | Hammad et al. |
| 2015/0134178 A1 | 5/2015 | Minoiu-Enache |

FOREIGN PATENT DOCUMENTS

| | | |
|---|---|---|
| CN | 102650882 | 8/2012 |
| CN | 202772924 | 3/2013 |
| WO | 2014058263 A1 | 4/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |

OTHER PUBLICATIONS

M. Fox, "Self-driving cars safer than those driven by humans: Bob Lutz", CNBC, www.cnbc.com, Sep. 8, 2014, 1 page.
U.S. Appl. No. 14/887,388, filed Oct. 20, 2015.
A. Abkowitz, "Do Self-Driving Cars Spell Doom for Auto Insurers?", Bloomberg L.P., Sep. 10, 2014, pp. 1-2.
Anonymous, "Self-Driving Cars and Insurance", Insurance Information Institute, Inc., Feb. 2015, pp. 1-3.
Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.
Smith, Mark. "Inovations: Emerging Trends in the Wheelchair Market." New Mobility Magazine, Aug. 1, 2014. Web. <http://www.newmobility.com/2014/08/emerging-trends/>.
Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.
Anonymous, 'System and Method to Target Advertisements for the Right Focus Group'. IP.com, No. 000218285, May 31, 2012, pp. 1-2.
Anonymous, "Car Built-In Mechanism to Enforce Mandatory Self-Driving Mode", IP.com, No. 000234916, Feb. 14, 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
T. Vanderbilt, "Let the Robot Drive: The Autonomous Car of the Future is Here", Wired Magazine, Conde Nast, www.wired.com, Jan. 20, 2012. pp. 1-34.
Chen S, et al., A Crash Risk Assessment Model for Roas Curves. Inproceedings 20th International Technical Conference on the Enhanced Saftey of Vehicles., 2007. Lyon, France.
E. Lehrer, "The Insurance Implications of Google's Self-Driving Car", Insurance Journal, Right Street BLOH=G, May 28, 2014, pp. 1-2.
Anonymous, "Diagnostics Mechanism for Self-Driving Cars to Validate Self-Driving Capabilities", IP.com, Jun. 6, 2014, pp. 1-5. IP.com.
U.S. Appl. No. 14/855,731 Non-Final Office Action Mailed Apr. 15, 2016.

* cited by examiner

US 9,481,367 B1

AUTOMATED CONTROL OF INTERACTIONS BETWEEN SELF-DRIVING VEHICLES AND ANIMALS

BACKGROUND

The present disclosure relates to the field of vehicles, and specifically to the field of self-driving vehicles (SDVs). Still more specifically, the present disclosure relates to the field of controlling self-driving vehicles when proximate to an animal.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a computer-implemented method and/or computer program product causes a self-driving vehicle (SDV) to avoid a physical encounter with an animal. One or more sensors on a self-driving vehicle (SDV) capture a description of an environment around an animal that the SDV is approaching. A camera captures an image of the animal that the SDV is approaching. An SDV on-board computer on the SDV determines an animal type of the animal based on the captured image of the animal, and then predicts a direction and speed of movement of the animal based on the animal type of the animal and the captured environment of the animal. The SDV on-board computer determines a probability of a physical encounter (E) between the SDV and the animal exceeding a predefined confidence value (C) based on the predicted direction of movement of the animal and a current speed and direction of movement of the SDV. In response to determining, by the SDV on-board computer and based on the predicted direction and speed of movement of the animal and the current speed and direction of the SDV, that E>C, the SDV on-board computer instructs an SDV control processor on the SDV to direct SDV vehicular physical control mechanisms on the SDV to adjust the current speed and direction of movement of the SDV, thereby reducing a likelihood of the SDV striking the animal.

In an embodiment of the present invention, a system includes one or more sensors, a camera, a processor, a computer readable memory, and a non-transitory computer readable storage medium. The one or more sensors are on a self-driving vehicle (SDV), and capture a description of an environment around an animal that the SDV is approaching. The camera, which may be on the SDV, captures an image of the animal that the SDV is approaching. The processor retrieves program instructions from the non-transitory computer readable storage medium and stores the program instructions in the computer readable memory, such that the program instructions, when executed by the processor via the computer readable memory, perform a method that includes: determining, by an SDV on-board computer, an animal type of the animal based on the captured image of the animal; predicting, by the SDV on-board computer, a direction and speed of movement of the animal based on the animal type of the animal and the captured environment of the animal; determining, by one or more processors, a probability of a physical encounter (E) between the SDV and the animal exceeding a predefined confidence value (C) based on the predicted direction of movement of the animal and a current speed and direction of movement of the SDV; and in response to determining, by the SDV on-board computer and based on the predicted direction and speed of movement of the animal and the current speed and direction of the SDV, that E>C, the SDV on-board computer instructing an SDV control processor on the SDV to direct SDV vehicular physical control mechanisms on the SDV to adjust the current speed and direction of movement of the SDV, thereby reducing a likelihood of the SDV striking the animal.

DETAILED DESCRIPTION

Figure 1:
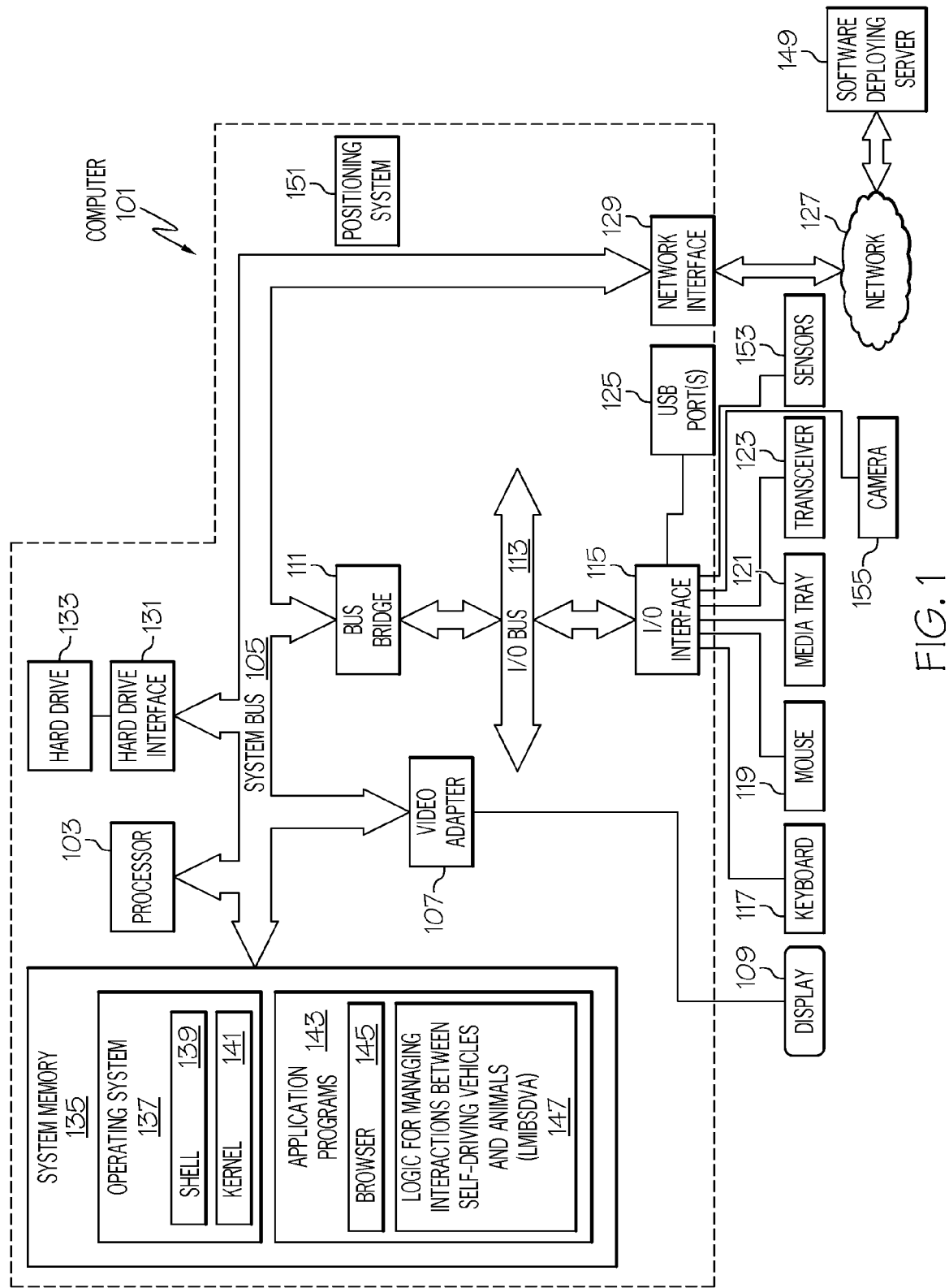
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, roadway monitoring computer 201 shown in FIG. 2 and in FIG. 3, SDV on-board computer 401 shown in FIG. 4, and/or a coordinating server 501 depicted in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), a camera 155 (capable of capturing still and moving video digital images), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among roadway monitoring computer 201, SDV on-board computer 401, and/or coordinating server 501 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Interactions Between Self-Driving Vehicles and Animals (LMIBSDVA) 147. LMIBSDVA 147 includes code for implementing the processes described below, including those described in FIGS. 2-6. In one embodiment, computer 101 is able to download LMIBSDVA 147 from software deploying server 149, including in an on-demand basis, wherein the code in LMIBSDVA 147 is not downloaded until needed for execution. In one embodiment of the present invention, software deploying server 149 performs all of the functions associated with the present invention (including execution of LMIBSDVA 147), thus freeing computer 101 from having to use its own internal computing resources to execute LMIBSDVA 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect animals, vehicles, road obstructions, pavement, etc. For example, if computer 101 is on board a self-driving vehicle (SDV), then sensors 153 may be cameras, radar transceivers, etc. that allow the SDV to detect the environment (e.g., animals, other vehicles, road obstructions, pavement, etc.) of that SDV, thus enabling it to be autonomously self-driven. Similarly, sensors 153 may be cameras, thermometers, moisture detectors, etc. that detect ambient weather conditions. Thus, sensors 153 include any type of sensor capable of capturing an environmental description of an environment, further including sensors such as a light meter, a microphone, a chemical detector, etc. In one or more embodiments of the present invention, sensors 153 are able to qualify (i.e., describe) an environment around an animal, such as the presence of other animals, weather conditions, the presence of vehicles, darkness/daylight, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In many locations, particularly in undeveloped countries, roads can often be traveled simultaneously by pedestrians, cows, bikes, carts, carriages, and other various biological entities and their gear. For purposes of the present invention, the term "biological entity" and "animal" are used interchangeably, and are defined as a non-human biological organism, which may be livestock (e.g., sheep, cattle, etc.), domesticated work animals (e.g., mules, horses, elephants, etc.), pets (e.g., dogs, cats, etc.), wildlife (e.g., deer, bears, lions, etc.), or any other type of non-human animal.

In order to handle roads in which vehicles, including self-driving vehicles (SDVs), are integrated with animals, the invention presented herein categorizes animals according to their type, which leads to a prediction of their expected movements and their paths. This prediction leads to directions/recommendations to SDVs to alter their paths in order to avoid hitting the animal(s). In one or more embodiments, this prediction is further established based on the environment around the animal and/or the SDV. An onboard parallel computational modeling and prediction apparatus is used to continually model all biological entities simultaneously as the vehicle moves through the environment.

In one embodiment of the present invention, an image analysis is performed by an SDV of biological entities (BE) on a road to identify any one of species, physiological state, physical encumbrances or enhancements, age, speed, acceleration, heading, etc. Based on the ability for a given BE to change speed and direction, as well as the likelihood that a given BE will change speed and/or direction, the speed and direction of an approaching SDV is adjusted accordingly.

Thus, an onboard modeling facility uses BE properties to model expected behavior, allowing the SDV to incorporate models of BE behavior into planning actions in the crowded environment.

Thus, the present invention predicts a direction and speed of movement of one or more animals, and adjusts the speed and direction of the SDV accordingly in order to avoid striking the animal(s). For example, assume that there are 100 sheep crossing a road on which the SDV is traveling. The present system has access to a database that indicates that it will take the 100 sheep 5 minutes to cross the road (as per a behavior model of the sheep). Since the SDV will have to wait for 5 minutes while the sheep cross the road, then the system will 1) stop the SDV to allow the sheep to pass, and 2) turn off the engine in the SDV, in order to avoid wasting fuel. Alternatively, in one embodiment, the system may 3) calculate another route and/or 4) instruct the SDV to turn around.

In another embodiment, in response to detecting the flock of 100 sheep crossing the road, the SDV will flash its headlights and/or send an electronic or visible message to other vehicles and/or SDVs stating "Sheep crossing road—Stop, slow down or find another route".

In one embodiment of the present invention, active learning is employed so that the system as a whole learns from the experiences of many SDVs and drivers, in different geographies and among cohorts. Geographies may include cities, rural areas, and the like. Cohorts may include people with certain characteristics, disabilities, etc.

In some scenarios, optionally, a weighted voting system may be used to weight the various variables used in making the decision regarding models of BE behavior and their use in planning actions in the crowded environment. Such inputs may include: a history of animals crossing a particular point in a road, the number and nature of such animals, the distance the animal is from the side of the road, other cars stopping nearby to allow animals to cross or otherwise get out of the way of the vehicles/SDVs, votes by nearby cars, etc. Such weighted voting approaches may be characterized primarily by three aspects—the inputs, the weights, and the quota. The inputs are (I1, I2, . . . , IN). N denotes the total number of inputs. An input's weight (w) is the number of "votes" associated with the input. The quota (q) is the minimum number of votes required to "pass a motion", which in this case refers primarily to a decision made by the SDV to adjust its speed/direction.

The present invention provides multiple advantages over the prior art. Specifically, the present invention provides the SDV with the ability to model BEs and their behavior, which is then incorporated into the SDV movement action plan.

Image analysis to identify BEs can allow large databases of models of BE behavior to be accessed rapidly. When new types of BEs are encountered for a given SDV (e.g., a white-tailed deer running across the path of the SDV that is driving along a particular roadway), the system incorporates the new data derived from this interaction, thus allowing the system to "learn" about the BE behavior and how SDVs respond to such behavior.

Thus, the presently presented system, method, and/or computer program product identifies BEs and their physical characteristics in the surroundings of an SDV, access information about the identified BEs from a database, use this information to model expected BE behavior using an onboard computer, and modify SDV behavior according to the modeled BE behavior.

The BE may be at least one of a dog, cat, horse, cow, yak, while-tailed deer, squirrel, possum, or other non-human entity.

In one embodiment, the BE is a work animal, which is affixed to at least one of a collar, saddle, harness, cart, rickshaw, shopping cart, or other non-motorized vehicle. If the work animal is affixed to such a vehicle, then its speed and movement is altered, which is recognized by the system when adjusting the speed and movement of the vehicle/SDV.

In one embodiment, the modeled BE behavior includes a given animal's maximum velocity and potential acceleration, which is used to adjust the speed and movement of the vehicle/SDV.

In one embodiment, the modeled BE behavior includes the given animal's propensity to jump or run given a particular surrounding (e.g., dense loud traffic), which is used to adjust the speed and movement of the vehicle/SDV.

In one embodiment, the modeled BE behavior includes considering the movement of one animal in the presence of other animals. For example, a dog's behavior might be modeled to move in a very different manner when it is alone as opposed to when it is in the presence of a squirrel or other animal.

Thus, in a high-level overview of one or more embodiments of the present invention, logic within an SDV predicts, based on known movement traits of the BE and the speed/movement and other features of the SDV, the likelihood of an encounter (E) between the SDV/vehicle and the BE. If this likelihood of such an encounter (E) reaches/exceeds a level of confidence (C) (i.e., E>C), then the SDV automatically adjusts its course, speed, etc., in order to avoid hitting the animal.

Figure 2:
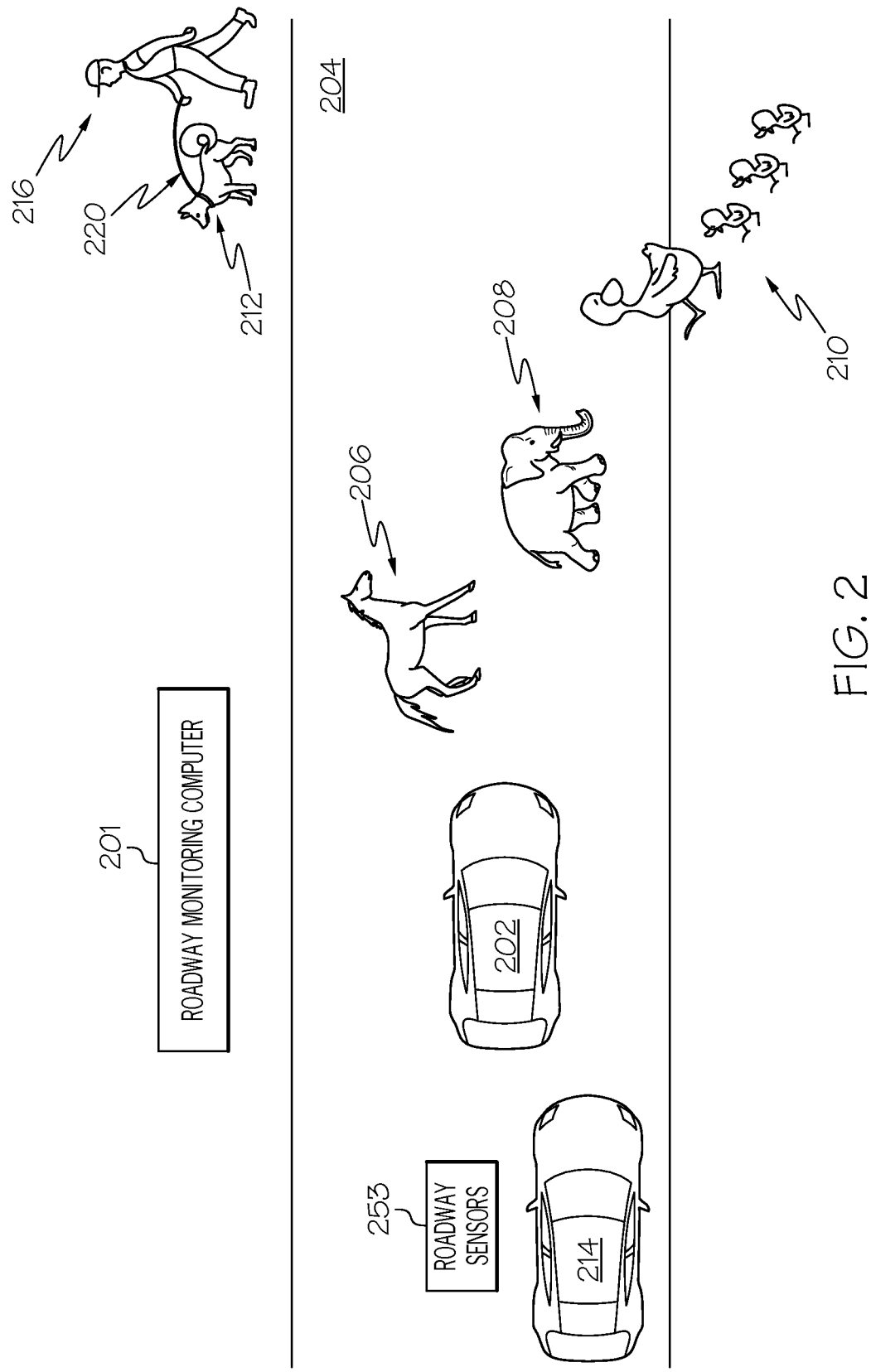
FIG. 2 illustrates an exemplary self-driving vehicle (SDV) approaching an animal.

With reference now to FIG. 2, an exemplary self-driving vehicle (SDV) 202 is depicted traveling along a roadway 204 in accordance with one or more embodiments of the present invention. Roadway 204 may be a public road, a highway, a street, a parking lot, a private road, an open field, or any other path that the SDV 202 is capable of traveling upon. As shown, SDV 202 is approaching one or more animals, including a horse 206 and an elephant 208 (both of which are currently on roadway 204), a line of ducks 210 (which are partially on the roadway 204) and a dog 212 (which is next to the roadway 204). Horse 206, elephant 208, ducks 210, and dog 212 all have different movement characteristics, as is recorded in a database of animal traits (e.g., animal traits database 406 shown in FIG. 4). These movement characteristics may be further dependent upon environmental stimuli.

For example, horse 206 may be able to make sudden lateral movements, particularly in response to being honked at by a car. However, if horse 206 were harnessed to a cart (not shown), then such lateral movement would be limited. The elephant 208 is unable to make any sudden movements, lateral or otherwise, due to its large size. The ducks 210 are able to move in any unexpected direction. That is, if a car horn is honked at the ducks 210, they are likely to scatter in all directions.

The dog 212 is able to move quickly, particularly if it sees the ducks 210, which could result in the dog 212 running into the roadway 204 to chase the ducks 210. However, the dog 212 is restrained by a leash 220 being held by a person 216; thus the system will predict that the dog 212 will remain in place.

These predicted animal movements are thus able to control the speed and direction of SDV 202, in order to avoid hitting the animals.

A roadway monitoring computer 201 (analogous to computer 101 shown in FIG. 1) monitors roadway sensors 253 (analogous to sensors 153 shown in FIG. 1), and/or computing devices in the SDV 202.

Examples of roadway sensors 253 include, but are not limited to, moisture sensors, traffic sensors, temperature sensors, light sensors, noise sensors, and traffic light sensors, which are used to detect road conditions on roadway 204.

A moisture sensor may utilize any type of technology for detecting the amount of moisture on the surface of roadway 204. For example, a Frequency Domain Reflectometry (FDR) sensor embedded within roadway 204 can be used to measure a frequency of an oscillating circuit in the FDR, which changes as the amount of moisture on roadway 204 changes. In another embodiment, an ohmmeter embedded on the surface of roadway 204 measures the amount of resistance between two electrical nodes, which changes as the amount of moisture on roadway 204 changes.

A traffic sensor may use any type of sensor that measures the quantity and speed of vehicles traveling on roadway 204. Examples of such traffic sensors include laser sensors that detect passing vehicles on roadway 204 as they break a laser pathway between a laser source and a laser sensor; mechanical pressure hoses mounted on the surface of roadway 204 that provide a change in pressure as cars drive over the hoses; inductive loops embedded within the roadway 204 that generate a field that changes when a metallic vehicle passes over the inductive loop; etc.

A temperature sensor may be a remote sensor that measures infrared emissions from the surface of the roadway 204; a thermocouple embedded within the surface of roadway 204 that measures the surface temperature of roadway 204 based on the change in resistance to the thermocouple caused by changes in roadway surface temperature; etc.

A light sensor may be any type of sensor that detects light levels, including but not limited to, photoresistors whose resistances change based on the amount of ambient light around particular positions on roadway 204.

A noise sensor (i.e., microphone) is any type of acoustic-to-electric sensor that converts sound (audible or non-audible) into an electrical signal, using electromagnetic induction, capacitance change, piezoelectricity induction, etc. imposed on the noise sensor elements by the sound. Thus, if the noise sensor detects a high level of traffic noise (as pre-identified according to a noise pattern indicative of many cars on the roadway 204), then a high level of traffic is inferred. Similarly, if the noise sensor detects a certain frequency/amplitude/volume of noise that has been predetermined to be indicative of a defective road condition (e.g., icy road conditions, potholes, loose pavement, etc.), then this road condition for roadway 204 is understood to exist by the SDV on-board computer 401 depicted in FIG. 4.

In one embodiment of the present invention, sensor readings from roadway sensors 253 shown in FIG. 2 are weighted and summed by a roadway monitoring computer 201 to further adjust the autonomous control of SDV 202. Thus, one or more processors within roadway monitoring computer 201 receive sensor readings from multiple sensors (roadway sensors 253), where each of the multiple sensors detects a different type of current condition of the roadway. The processor(s) weight each of the sensor readings for different current conditions of the roadway, and then sum the weighted sensor readings for the different current conditions of the roadway. The processor(s) determine whether the summed weighted sensor readings exceed a predefined level. In response to determining that the summed weighted sensor readings do exceed a predefined level, then autonomous control of SDV 202 continues in a same manner (e.g., "normal" mode in dry roadway conditions). However, if a first sensor (from roadway sensors 253) detects ice on the roadway 204 and the second sensor (from roadway sensors 253) detects darkness, then the SDV 202 may be shifted to "caution" mode, due to historical data that shows that many more accidents are caused by "black ice" (ice that is not visible to the eye of the driver in dark conditions). Assume further that the first sensor reading (detecting ice on the roadway 204) is weighted at one level (e.g., is multiplied by 5) and the second sensor reading (detecting darkness on the roadway 204) is weighted at another level (e.g., is multiplied by 3). These weighted sensor readings are then added up. If the summed sensor reading weighted values exceed some predetermined value (which has been predetermined based on historic or engineering analyses as being a breakpoint over which the chance of accidents greatly increase), then control of the SDV goes to the more conservative "caution" mode (e.g., gives the SDV more cushion room, greater time to brake, etc.). However, if the summed sensor reading weighted values fall below this predetermined value, then control stays in the "normal" mode (e.g., gives the SDV the default amount of cushion room, time to brake, etc.).

In one embodiment of the present invention, a weighted voting system is used to weight the various variables used in making the decisions regarding whether to place the SDV in the "normal" or "caution" modes described above. Such inputs may include: a history of accidents on a roadway 204 for SDVs in "normal autonomous mode" compared to SDVs on the roadway 204 in "caution autonomous mode", a level of fuel usage/efficiency of SDVs in "normal autonomous mode" compared to SDVs on the roadway 204 in "caution autonomous mode", etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to determine which control mode to use). The inputs are (I1, I2, . . . , IN), where "N" denotes the total number of inputs. An input's weight (w) is the number of "votes" associated with the input to determine how significant (weighted) the input is. A quota (q) is the minimum number of votes required to "pass a motion", which in this case refers to a decision made to place the SDV 204 in the "normal autonomous mode" or the more careful "caution autonomous mode".

Figure 3:
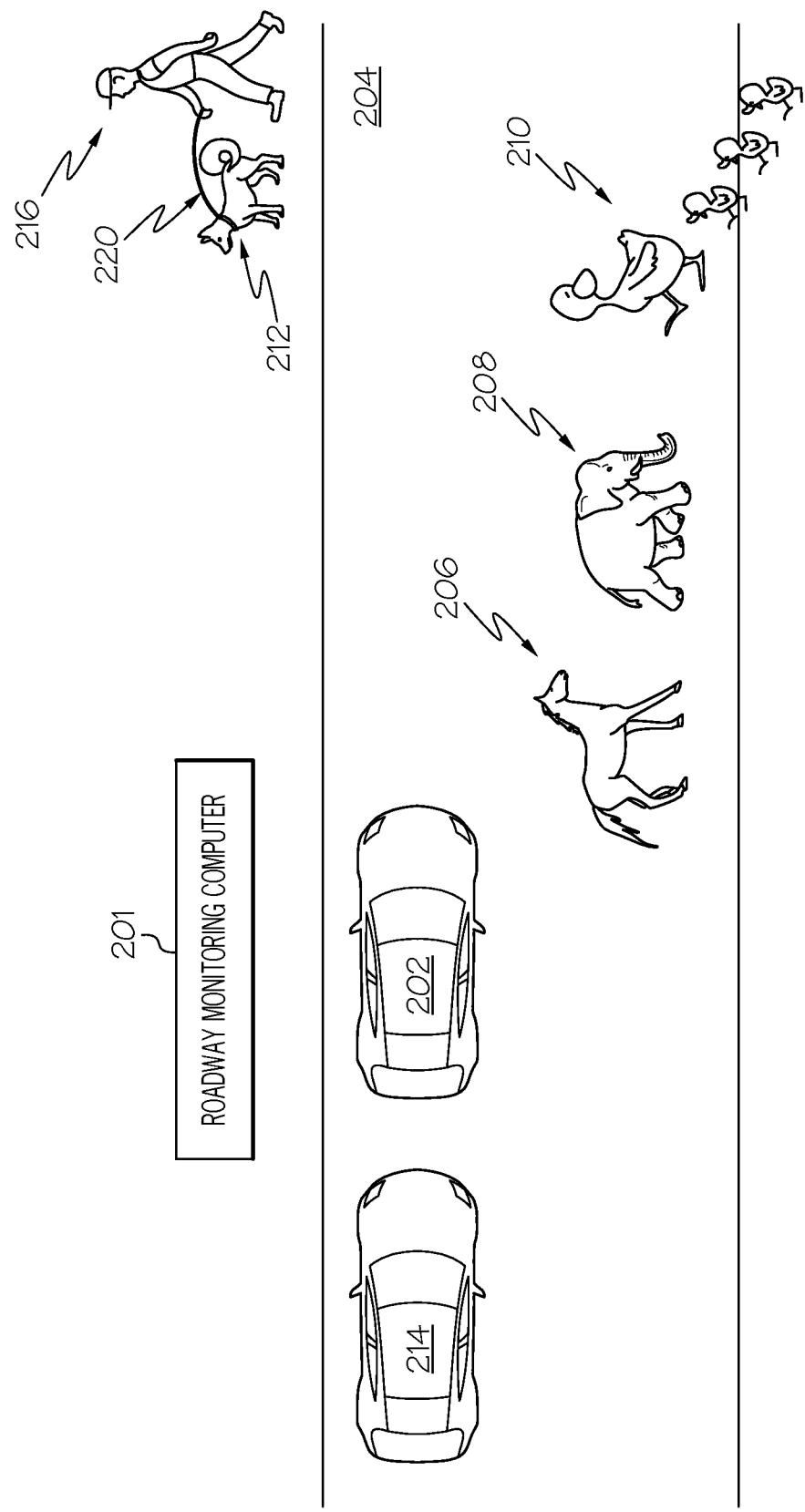
FIG. 3 depicts the SDV in FIG. 2 being repositioned based on the presence of the animal.

As shown in FIG. 3, once the roadway monitoring computer 201 or the SDV 202 recognizes the animal/BEs in or next to the roadway, the SDV 202 is autonomously redirected to move out of the way of the animals/BEs. Note that the horse 206 has moved in a predicted direction that keeps the horse 206 out of the pathway of the SDV 202. The elephant 208 is still moving in a same direction (as predicted by the system), the ducks 210 are moving so slowly that the SDV 202 poses no risk to them (as predicted by the system), and the dog 212 remains sitting and restrained by the leash 220 (as predicted by the system).

Furthermore, SDV 202 (and/or roadway monitoring computer 201) has directed SDV 214 to "follow its lead" around the animals. For example, an SDV on-board computer within the SDV 202 has sent a message to an SDV on-board computer within the SDV 214 directing the SDV 214 to (1) follow behind SDV 202, and (2) move very close to SDV 202, thereby creating a close grouping of SDVs that are unlikely to strike the animals.

Figure 4:
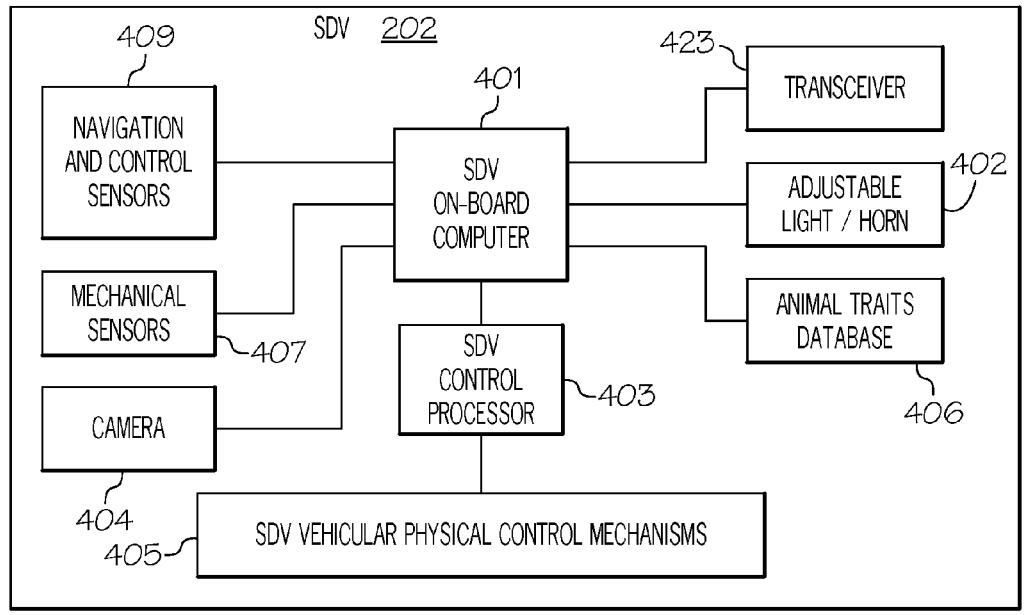
FIG. 4 depicts additional detail of control hardware within the SDV depicted in FIG. 2.

With reference now to FIG. 4, additional detail of hardware components within SDV 202 (and/or SDV 214 shown in FIG. 2) are depicted.

An SDV on-board computer 401 uses outputs from navigation and control sensors 409 to control the SDV 202. Navigation and control sensors 409 include hardware sensors that (1) determine the location of the SDV 202; (2) sense other cars and/or obstacles and/or physical structures around SDV 202; (3) measure the speed and direction of the SDV 202; and (4) provide any other inputs needed to safely control the movement of the SDV 202.

With respect to the feature of (1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of (2) sensing other cars and/or obstacles and/or physical structures around SDV 202, the positioning system 151 may use radar or other electromagnetic energy that is emitted from an electromagnetic radiation transmitter (e.g., transceiver 423 shown in FIG. 4), bounced off a physical structure (e.g., another car), and then received by an electromagnetic radiation receiver (e.g., transceiver 423). By measuring the time it takes to receive back the emitted electromagnetic radiation, and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 401.

With respect to the feature of (3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of (4) providing any other inputs needed to safely control the movement of the SDV 202, such inputs include, but are not limited to, control signals to activate a horn, turning indicators, flashing emergency lights, etc. on the SDV 202.

The SDV 202 is able to operate in an autonomous mode, in which the SDV vehicular physical control mechanisms 405 (e.g., the engine throttle, steering mechanisms, braking systems, turn signals, etc.) are controlled by the SDV control processor 403, which is under the control of the SDV on-board computer 401. Thus, by processing inputs taken from navigation and control sensors 409, the SDV 202 can be controlled autonomously.

Furthermore, the SDV on-board controller 401 is able to communicate with other systems, such as the SDV 214 shown in FIG. 2 and FIG. 3, via a transceiver 423 (analogous to transceiver 123 shown in FIG. 1).

In one or more embodiments of the present invention, the SDV on-board computer 401 is coupled to a camera 404, which is able to capture (preferably in digital format) still and moving video images, including but not limited to images of the animal.

Also within the exemplary SDV 202 shown in FIG. 4 is an adjustable light/horn 402, which is able to automatically illuminate (e.g., flash) or sound off (e.g., honk) in response to the SDV on-board computer 401 detecting the presence and/or location and/or movement of an animal, thus prompting the animal to get out of the way of the oncoming SDV 202.

Also within the exemplary SDV 202 shown in FIG. 4 are mechanical sensors 407, which generate electronic signals describing the state of mechanical equipment within SDV 202, including but not limited to the SDV vehicular physical control mechanisms 405. Thus, mechanical sensors 407 are able to detect the thickness of brake pads, pressure in a brake line, tire inflation levels, any loose linkage in a steering assembly, etc., any of which affect the safety and/or performance of SDV 202.

Figure 5:
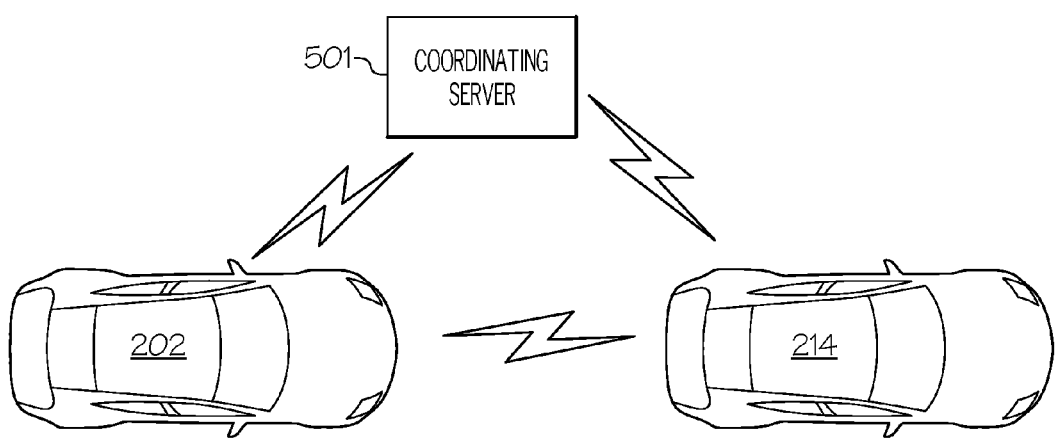
FIG. 5 depicts communication linkages among an SDV on-board computer on a first SDV, an SDV on-board computer on a second SDV, and a coordinating server in accordance with one or more embodiments of the present invention.

Using their respective transceivers, the coordinating server 501 shown in FIG. 5 (analogous to computer 101 shown in FIG. 1 and/or roadway monitoring computer 201 shown in FIG. 2) is able to communicate with, and thus control computing devices within SDV 202 (e.g., SDV on-board computer 401 shown in FIG. 4), as well as being able to communicate with control computing devices within SDV 214.

Figure 6:
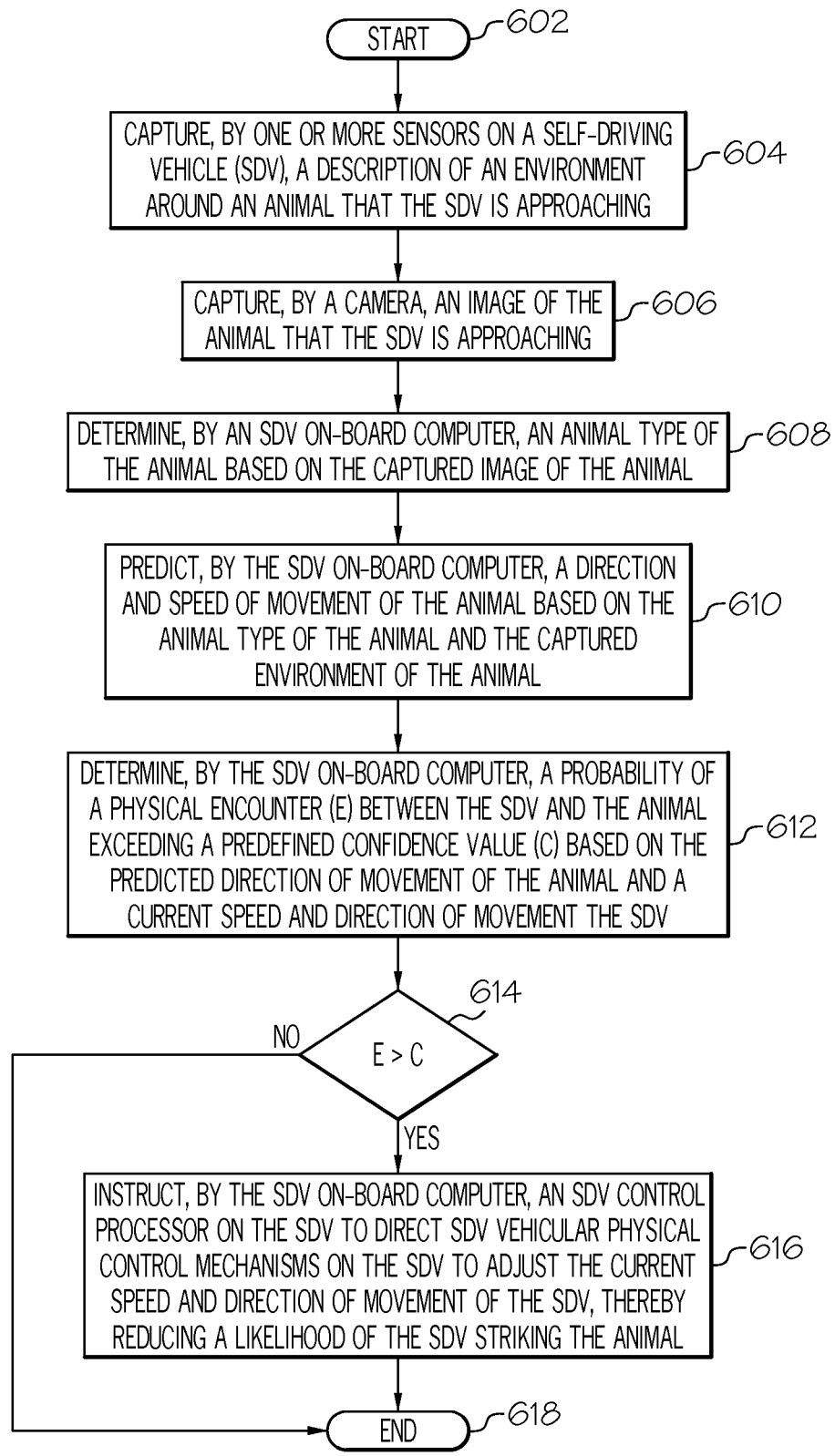
FIG. 6 is a high-level flow chart of one or more steps performed by one or more processors and/or other hardware devices to control a physical interaction between a self-driving vehicle (SDV) and an animal.

With reference now to FIG. 6, a high-level flow chart of one or more operations performed by a processor and/or other hardware devices for controlling a physical interaction between a self-driving vehicle (SDV) and an animal (e.g., horse 206, elephant 208, etc. shown in FIG. 2) is presented.

After initiator block 602, one or more sensors (e.g., sensors 153 shown in FIG. 1) in a self-driving vehicle (SDV) (e.g., SDV 202 in FIG. 2) capture a description of an environment around an animal that the SDV is approaching, as described in block 604. This environment may be other vehicles, other animals, weather conditions, darkness, etc.

As described in block 606, a camera (e.g., camera 155 shown in FIG. 1, which may be mounted on SDV 202 or as part of the roadway monitoring computer 201 shown in FIG. 2) captures an image of the animal that the SDV is approaching.

As described in block 608, an SDV on-board computer (e.g., SDV on-board computer 401 within SDV 202) determines an animal type of the animal based on the captured image of the animal, as well as the direction in which the animal is pointed/facing (i.e., toward or away from the SDV, facing to the left or right of the SDV, etc.). This animal type includes, but is not limited to, the breed of the animal, the age and size of the animal, etc. Note that in one embodiment, this determination may be performed by the roadway monitoring computer 201 or on the "cloud" (i.e., a collection of shared computing resources that are network accessible).

As described in block 610, the SDV on-board computer (or alternatively the roadway monitoring computer 201) predicts a direction and speed of movement of the animal based on the animal type of the animal and the captured environment of the animal. That is, using information from the animal traits database 406 shown in FIG. 4 and environmental sensor readings from the sensors 153), the SDV on-board computer is able to predict the movement of the animal. Note that in one embodiment, this prediction may be determined by the roadway monitoring computer 201 or on the "cloud" (i.e., a collection of shared computing resources that are network accessible).

As described in block 612, the SDV on-board computer determines a probability of a physical encounter (E) between the SDV and the animal exceeding a predefined confidence value (C) based on the predicted direction of movement of the animal and a current speed and direction of movement of the SDV. That is, the SDV on-board computer knows the current speed and direction of the SDV (from navigation and control sensors 409 shown in FIG. 4), and has predicted the movement of the animal based on its breed/size/etc. and current environmental conditions (honking vehicles, other animals, weather, darkness, etc.). This leads the calculation by the SDV on-board computer of the probability of the physical encounter (E). Note that in one embodiment, this determination may be performed by the roadway monitoring computer 201 or on the "cloud" (i.e., a collection of shared computing resources that are network accessible).

As shown in query block 614, in response to determining, by the SDV on-board computer and based on the predicted direction and speed of movement of the animal and the current speed and direction of the SDV, that E>C, then the SDV on-board computer instructs an SDV control processor on the SDV to direct SDV vehicular physical control mechanisms (e.g., SDV vehicular physical control mechanisms 405 shown in FIG. 4) on the SDV to adjust the current speed and direction of movement of the SDV, thereby reducing a likelihood of the SDV striking the animal (block 616).

The flow chart ends at terminator block 618.

In one embodiment of the present invention, if the animal is predicted to block the path of the SDV beyond some predetermined length of time, then the SDV is automatically shut off, in order to conserve fuel. Thus, in this embodiment the SDV on-board computer, based on the predicted direction and speed of movement of the animal, predicts a length of time that the animal will block a pathway of the SDV. In response to the predicted length of time exceeding a predetermined value, the SDV on-board computer stops the SDV and turns its engine off. Alternatively, the SDV on-board computer may redirect the SDV to another route.

In one embodiment of the present invention, the SDV blocks the field of view of another SDV, thus preventing the other SDV from establishing its own path around the animal(s), since the other SDV cannot see the animals. For example, as shown in FIG. 2, SDV 214 is unable to see (or more specifically a camera mounted on SDV 214 is unable to capture an image of) horse 206. However, a camera on SDV 202 is able to photograph horse 206, and thus sends this photograph to SDV 214 so that SDV 214 can plans its route in a manner that avoids the horse 206. Thus, the first SDV (SDV 202) blocks a field of view of a second SDV (SDV 214) such that a camera in the second SDV is unable to detect the animal. The SDV on-board computer in the first SDV then transmits, to the SDV on-board computer in a second SDV, the image of the animal that the camera on the first SDV captured.

In one embodiment of the present invention, rather than only transmitting the image of the animal, the first SDV sends the second SDV the predicted direction and speed of movement of the animal that was created by the SDV on-board computer in the first SDV.

In one embodiment of the present invention, rather than only transmitting the image of the animal and/or the predicted direction and speed of movement of the animal, the first SDV sends the second SDV a recommended navigation plan to avoid striking the animal, which was generated by the first SDV. Since the first SDV is able to see the animal sooner, then the recommended navigation plan is developed before the second SDV could do so.

In one embodiment of the present invention, the first computer directs the second computer to "close in" on the first SDV (as shown in FIG. 3) and to follow the lead of the first SDV. Thus, the SDV on-board computer on the first SDV generates a recommended navigation plan to avoid striking the animal, and then transmits, to an SDV on-board computer on a second SDV, instructions to move the second SDV to a position that is within a predetermined distance from the first SDV and to follow the recommended navigation plan along with the first SDV.

In one embodiment of the present invention, movement of an animal is predicted based on the animal matching features of a cohort of animals who have crossed or otherwise occupied the roadway 204 under similar environmental conditions, time of day, precipitation, etc. Based on these historical data about other similar animals, an assumption is made that the current animal will likewise cross or otherwise travel on the roadway 204 in a similar manner as that of the members of the cohort.

In one embodiment of the present invention, upon a successful prediction of animal movement on the roadway 204, the SDV on-board computer may receive feedback regarding the successful prediction, to further refine and improve accuracy of its model for future predictions.

For example, assume that ducks who have a similar trait (e.g., gait, direction of movement, etc.) as ducks 210 have crossed roadway 204 in 5 seconds. Since these ducks 210 have the same traits as these similar animals (i.e., within a predefined cohort of animals), a prediction is made that ducks 210 will also cross roadway 204 in 5 seconds.

Thus, in one embodiment of the present invention one or more processors (e.g., within roadway monitoring computer 201 and/or SDV on-board computer 401 and/or coordinating server 501 depicted above) retrieve animal profile information about the animal (e.g., ducks 210), and then assign the animal to a cohort of animals who have crossed the roadway on which the SDV is traveling. As described above, the animal shares more than a predetermined quantity of traits with members of the cohort of animals. One or more processors then retrieve historical data (e.g., stored within computer 101 shown in FIG. 1) that describes movement by members of the cohort of animals when approaching the position on the roadway that is being approached by the SDV. The processor(s) then predict when the animal will reach the position on the roadway that is being approached by the SDV based on the historical data describing movement by members of the cohort of animals when approaching the position on the roadway that is being approached by the SDV. The SDV control processor on the SDV then adjusts the current speed and direction of movement of the SDV according to the historical data describing movement by members of the cohort of animals when approaching the position on the roadway that is being approached by the SDV, in order to avoid hitting the animal.

In an embodiment of the present invention and as described above, the SDV is selectively placed in "normal autonomous mode" or "caution autonomous mode" based on current roadway conditions. Thus, one or more processors receive roadway sensor readings from multiple roadway sensors (e.g., roadway sensors 253 shown in FIG. 2), where each of the multiple roadway sensors detects a different type of current condition of the roadway. The processor(s) assign a weight to each of the roadway sensor readings for different current conditions of the roadway (e.g., weighting wet conditions over dark conditions). The processor(s) then sum the weighted roadway sensor readings for the different current conditions of the roadway, and determine whether or not the summed weighted roadway sensor readings exceed a predefined level (e.g., a numeric value of weighted sensor readings). In response to the processor(s) determining that the summed roadway weighted sensor readings exceed the predefined level, the SDV control processor on the SDV adjusts the current speed and direction of movement of the SDV in order to avoid striking the animal at the position on the roadway that is being approached by the SDV.

In an embodiment of the present invention, autonomous control of the SDV is adjusted on the condition of mechanical systems on the SDV. For example, if the braking system of the SDV is in poor condition (e.g., the brake pads are worn down, such that it takes the SDV longer to stop than if the SDV had new brake pads), then the autonomous mode may be moved from the "normal autonomous mode" described herein to the "caution autonomous mode", thus allowing more distance for stopping the SDV (e.g., applying the brakes sooner, slowing the SDV down, etc.).

Thus, in one embodiment of the present invention, one or more processors (e.g., within the SDV) receive operational readings from one or more operational sensors (e.g., mechanical sensors 407 shown in FIG. 4) on the SDV, where the operational sensors detect a current state of equipment on the SDV. The processor(s), based on received operational readings, detect a fault (e.g., a mechanical fault such as faulty brakes, loose steering linkage, etc.) with the equipment on the SDV. In response to detecting the fault with the equipment on the SDV, the SDV control processor on the SDV adjusts the current speed and direction of movement of the SDV in order to avoid striking the animal at the position on the roadway that is being approached by the SDV.

Similarly, in one embodiment of the present invention, the SDV on-board computer on the SDV receives a first set of sensor readings (e.g., from roadway sensors 253 shown in FIG. 2) describing a physical condition of the roadway and a second set of sensor readings (e.g., from mechanical sensors 407 shown in FIG. 4) describing a mechanical condition of the SDV. The SDV on-board computer on the SDV then selectively shifts the SDV from a "normal" autonomous mode to a "caution" autonomous mode, such that the "caution" autonomous mode directs the SDV to travel slower than when in the "normal" autonomous mode.

In one embodiment of the present invention, the camera (e.g., mounted on the SDV) detects a non-motorized vehicle (e.g., a wagon, cart, etc.) that is affixed to the animal. The SDV on-board computer then further predicts the direction and speed of movement of the animal based on the presence of and characteristics of the affixed vehicle (e.g., there will be greatly reduced lateral movement of a horse that is harnessed to a cart than an unbridled horse).

In one embodiment of the present invention, the animal may be exhibiting movement (e.g., an excited appearance/movement) that is unpredictable. The on-board computer 401 can thus perform a video analysis of images from camera 404, make an assumption that the animal's movement will be irregular/excited and thus hard to predict, and further adjust the control of the SDV 202 (e.g., by providing additional time/space cushion around the animal in order to compensate for any unexpected movement into the roadway 204 by the animal).

In another example, the animal may be accompanied by a human handler (e.g., the animal is a dog on a leash being held by a human being). If so, then a likelihood of the animal entering the roadway decreases, and control of the SDV 202 is handled accordingly.

Active learning may be employed so that the system as a whole learns from the experiences of many SDVs and drivers, in different geographies and among cohorts. Geographies may include cities, rural areas, and the like. Cohorts from which the SDVs/drivers have a history of experience include cohorts of animals with certain characteristics. The active learning may also be used to update the profile of the animal by taking into account that an older animal is less energetic than when it was when younger. The learning may also affect the animal's profile by taking into account how the given animal reacts to particular locations (e.g., becoming very excited and chasing strangers when it is in a crowded location or one where there are other animals, or whether it has a propensity to chase cars, etc.).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
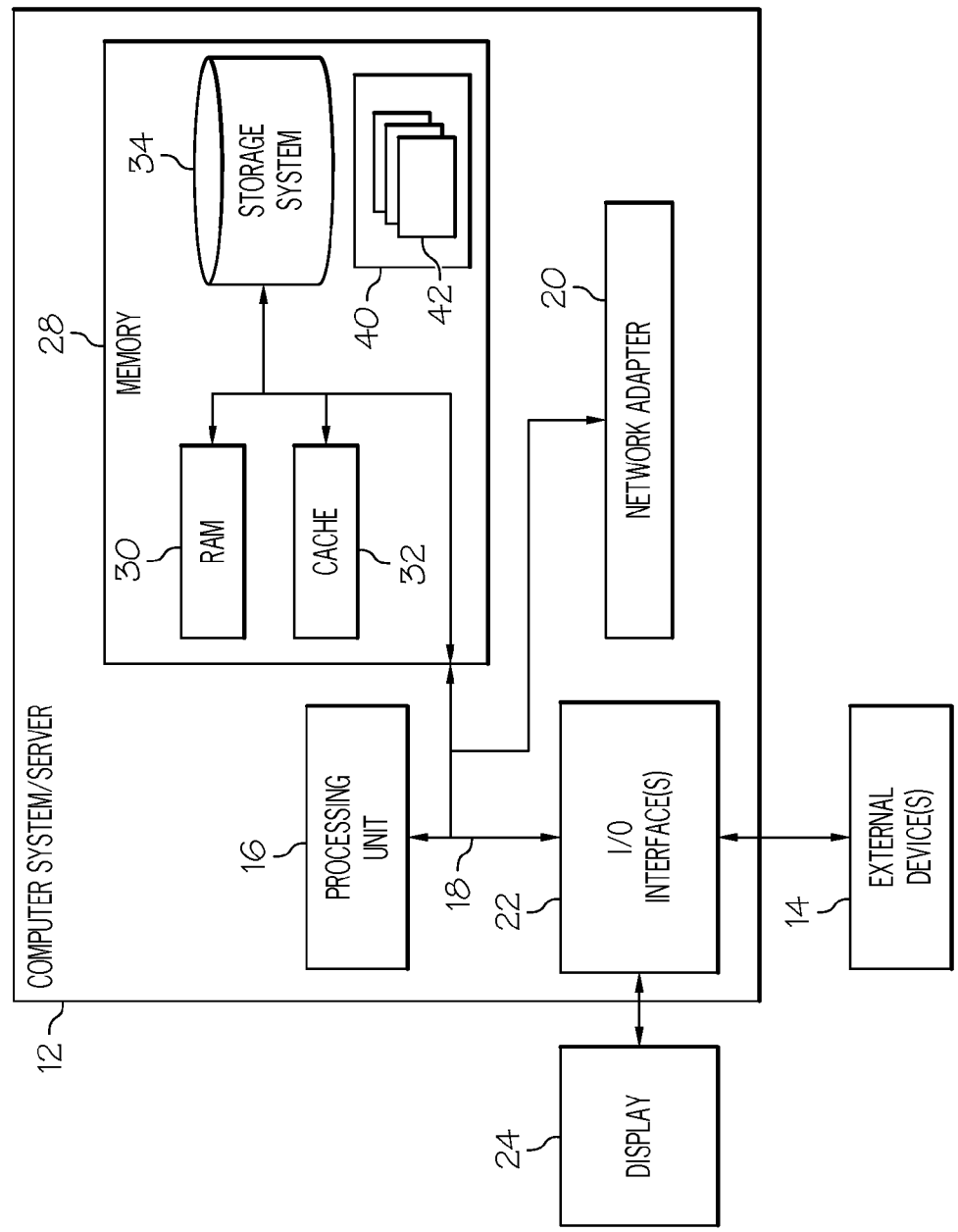
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
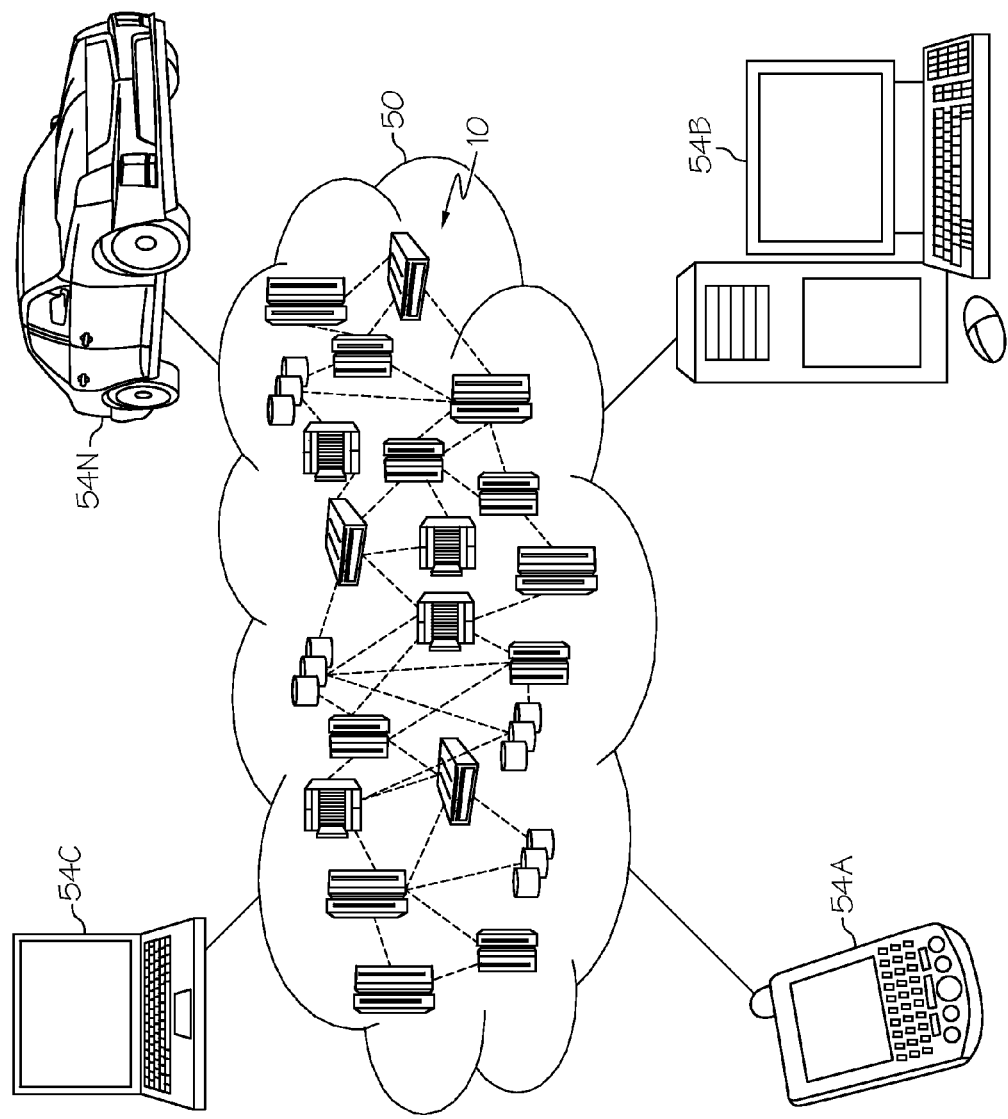
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 8 are intended to be illustrative only and that computing nodes 10 and cloud computing environment 50 can communicate with any type of computerized device over any type of network and/or network addressable connection (e.g., using a web browser).

Figure 9:
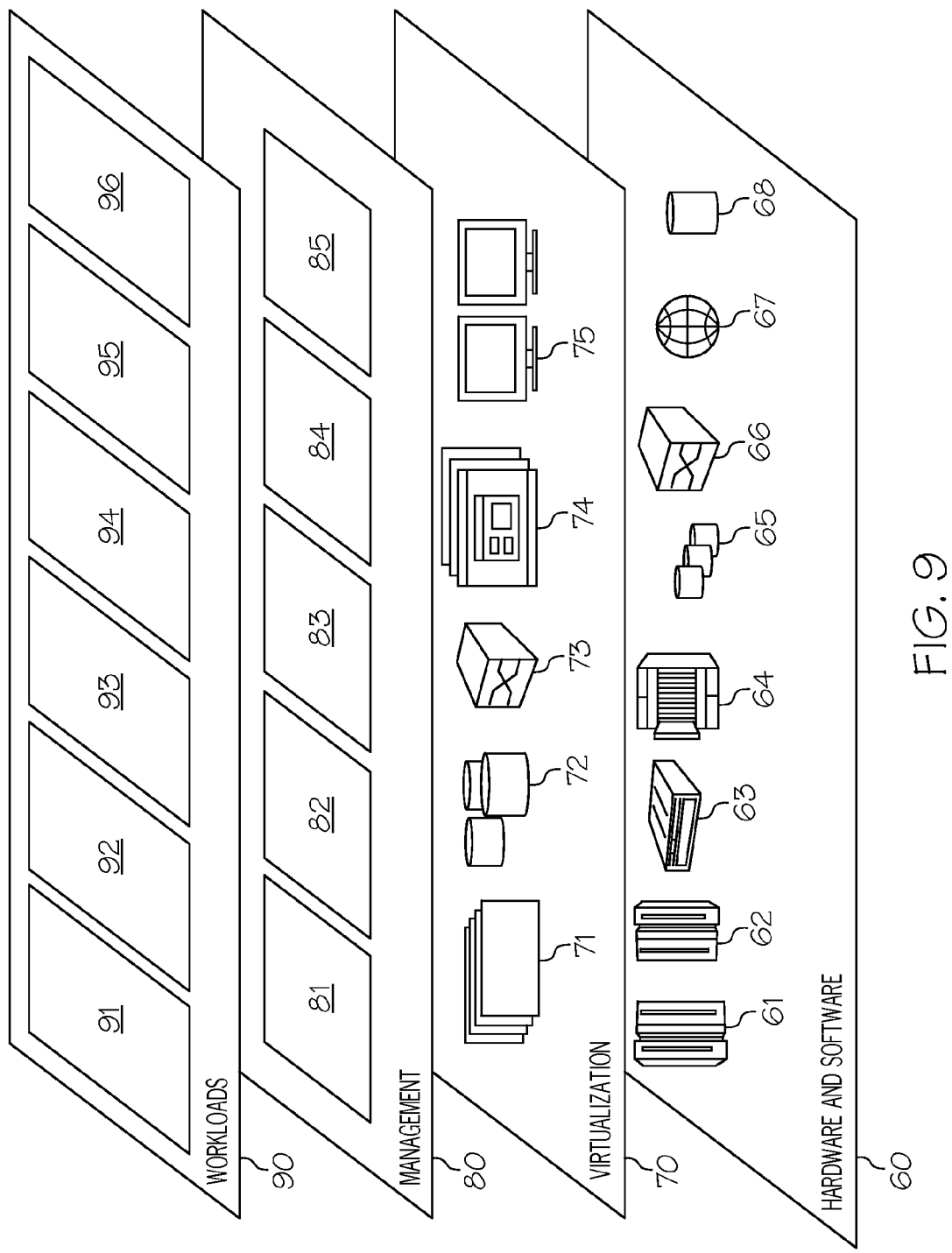
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for controlling a physical encounter between an SDV and an animal as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for causing a self-driving vehicle (SDV) to avoid a physical encounter with an animal, the computer-implemented method comprising:
 capturing, by one or more sensors on the self-driving vehicle (SDV), a description of an environment around the animal that the SDV is approaching;
 capturing, by a camera, an image of the animal that the SDV is approaching;

determining, by an SDV on-board computer, a species of the animal based on the captured image of the animal;

predicting, by the SDV on-board computer, a direction and speed of movement of the animal based on the determined species of the animal and the captured description of the environment around the animal;

determining, by the SDV on-board computer, a probability of a physical encounter (E) between the SDV and the animal exceeding a predefined confidence value (C) based on the predicted direction of movement of the animal and a current speed and direction of movement of the SDV;

in response to determining, by the SDV on-board computer and based on the predicted direction and speed of movement of the animal and the current speed and direction of the SDV, that E is greater than C, the SDV on-board computer instructing an SDV control processor on the SDV to direct SDV vehicular physical control mechanisms on the SDV to adjust the current speed and direction of movement of the SDV, thereby reducing a likelihood of the SDV striking the animal;

predicting, by the SDV on-board computer and based on the predicted direction and speed of movement of the animal, a length of time that the animal will block a pathway of the SDV; and in response to the predicted length of time exceeding a predetermined value, stopping, by the SDV on-board computer, the SDV and turning off, by the SDV on-board computer, an engine in the SDV.

2. The computer-implemented method of claim 1, wherein the SDV is a first SDV, wherein the first SDV blocks a field of view of a second SDV such that a camera in the second SDV is unable to detect the animal, and wherein the computer-implemented method further comprises:

transmitting, from the SDV on-board computer in the first SDV to an SDV on-board computer in the second SDV, the image of the animal that the camera on the first SDV captured.

3. The computer-implemented method of claim 1, wherein the SDV is a first SDV, wherein the first SDV blocks a field of view of a second SDV such that a camera in the second SDV is unable to detect the animal, and wherein the computer-implemented method further comprises:

transmitting, from the SDV on-board computer in the first SDV to an SDV on-board computer in the second SDV, the predicted direction and speed of movement of the animal that was created by the SDV on-board computer in the first SDV.

4. The computer-implemented method of claim 1, wherein the SDV is a first SDV, wherein the first SDV leads a second SDV, and wherein the computer-implemented method further comprises:

generating, by the SDV on-board computer on the first SDV, a recommended navigation plan to avoid striking the animal; and transmitting, from the first SDV to the second SDV, the recommended navigation plan.

5. The computer-implemented method of claim 1, wherein the SDV is a first SDV, wherein the first SDV leads a second SDV, and wherein the computer-implemented method further comprises:

generating, by the SDV on-board computer on the first SDV, a recommended navigation plan to avoid striking the animal; and transmitting, from the SDV on-board computer on the first SDV to an SDV on-board computer on the second SDV, instructions to move the second SDV to a position that is within a predetermined distance from the first SDV and to follow the recommended navigation plan along with the first SDV.

6. The computer-implemented method of claim 1, further comprising:

retrieving, by one or more processors, animal profile information about the animal;

assigning, by the one or more processors, the animal to a cohort of animals that have crossed a roadway on which the SDV is traveling, wherein the animal shares more than a predetermined quantity of traits with members of the cohort of animals;

retrieving, by the one or more processors, historical data describing movement by members of the cohort of animals when crossing the roadway on which the SDV is traveling;

predicting, by the one or more processors, when the animal will reach a position on the roadway that the SDV is approaching based on the historical data describing the movement by the members of the cohort of animals while crossing the position on the roadway that the SDV is approaching; and further adjusting, by the SDV control processor on the SDV, the current speed and direction of movement of the SDV according to the historical data describing the movement by the members of the cohort of animals when crossing the position on the roadway that the SDV is approaching.

7. The processor-implemented method of claim 1, further comprising:

receiving, by one or more processors, roadway sensor readings from multiple roadway sensors, wherein each of the multiple roadway sensors detects different current conditions of the roadway;

weighting, by the one or more processors, each of the roadway sensor readings for the different current conditions of the roadway;

summing, by the one or more processors, weighted roadway sensor readings for the different current conditions of the roadway;

determining, by the one or more processors, whether the summed weighted roadway sensor readings exceed a predefined level; and in response to determining that the summed roadway weighted sensor readings exceed the predefined level, further adjusting, by the SDV control processor on the SDV, the current speed and direction of movement of the SDV in order to avoid the SDV striking the animal at the position on the roadway that the SDV is approaching.

8. The processor-implemented method of claim 1, further comprising:

receiving, by one or more processors, operational readings from one or more operational sensors on the SDV, wherein the one or more operational sensors detect a current state of equipment on the SDV;

detecting, by the one or more processors and based on received operational readings, a fault with the equipment on the SDV; and in response to detecting the fault with the equipment on the SDV, further adjusting, by the SDV control processor on the SDV, the current speed and direction of movement of the SDV in order to avoid the SDV striking the animal at the position on the roadway that the SDV is approaching.

9. The computer-implemented method of claim 1, further comprising:

detecting, by the camera, a non-motorized vehicle that is affixed to the animal; and further predicting, by the SDV on-board computer, the direction and speed of movement of the animal based on a presence of and characteristics of the affixed vehicle.

10. A computer program product for causing a self-driving vehicle (SDV) to avoid a physical encounter with an animal, the computer program product comprising a non-transitory computer readable storage medium having program code embodied therewith, the program code readable and executable by a processor to perform a method, the method comprising:

capturing, by one or more sensors on the self-driving vehicle (SDV), a description of an environment around the animal that the SDV is approaching;

capturing, by a camera on the SDV, an image of the animal that the SDV is approaching;

determining, by an SDV on-board computer, a species of the animal based on the captured image of the animal;

predicting, by the SDV on-board computer, a direction and speed of movement of the animal based on the determined species of the animal and the captured description of the environment around the animal;

determining, by the SDV on-board computer, a probability of a physical encounter (E) between the SDV and the animal exceeding a predefined confidence value (C) based on the predicted direction of movement of the animal and a current speed and direction of movement of the SDV;

in response to determining, by the SDV on-board computer and based on the predicted direction and speed of movement of the animal and the current speed and direction of the SDV, that E is greater than C, the SDV on-board computer instructing an SDV control processor on the SDV to direct SDV vehicular physical control mechanisms on the SDV to adjust the current speed and direction of movement of the SDV, thereby reducing a likelihood of the SDV striking the animal;

predicting, based on the predicted direction and speed of movement of the animal, a length of time that the animal will block a pathway of the SDV; and in response to the predicted length of time exceeding a predetermined value, stopping, by the SDV on-board computer, the SDV and turning off, by the SDV on-board computer, an engine in the SDV.

11. The computer program product of claim 10, wherein the SDV is a first SDV, wherein the first SDV blocks a field of view of a second SDV such that a camera in the second SDV is unable to detect the animal, and wherein the method further comprises:

transmitting, from the SDV on-board computer in the first SDV to an SDV on-board computer in the second SDV, the image of the animal that the camera on the first SDV captured.

12. The computer program product of claim 10, wherein the SDV is a first SDV, wherein the first SDV blocks a field of view of a second SDV such that a camera in the second SDV is unable to detect the animal, and wherein the method further comprises:

transmitting, from the SDV on-board computer in the first SDV to an SDV on-board computer in the second SDV, the predicted direction and speed of movement of the animal that was created by the SDV on-board computer in the first SDV.

13. The computer program product of claim 10, wherein the SDV is a first SDV, wherein the first SDV leads a second SDV, and wherein the method further comprises:

generating, by the SDV on-board computer on the first SDV, a recommended navigation plan to avoid striking the animal; and transmitting, from the SDV on-board computer on first SDV to an SDV on-board computer on the second SDV, instructions to move the second SDV to a position that is within a predetermined distance from the first SDV and to follow the recommended navigation plan along with the first SDV.

14. A system for causing a self-driving vehicle (SDV) to avoid a physical encounter with an animal, comprising:

one or more sensors on the self-driving vehicle (SDV) that capture a description of an environment around the animal that the SDV is approaching;

a camera on the SDV that captures an image of the animal that the SDV is approaching; and a processor coupled to a computer readable memory and a non-transitory computer readable storage medium, wherein the processor retrieves program instructions from the non-transitory computer readable storage medium and stores the program instructions in the computer readable memory, wherein the program instructions, when executed by the processor via the computer readable memory, perform a method comprising:

determining, by an SDV on-board computer, a species of the animal based on the captured image of the animal;

predicting, by the SDV on-board computer, a direction and speed of movement of the animal based on the determined species of the animal and the captured description of the environment around the animal;

determining, by the SDV on-board computer, a probability of a physical encounter (E) between the SDV and the animal exceeding a predefined confidence value (C) based on the predicted direction of movement of the animal and a current speed and direction of movement of the SDV;

in response to determining, by the SDV on-board computer and based on the predicted direction and speed of movement of the animal and the current speed and direction of the SDV, that E is greater than C, the SDV on-board computer instructing an SDV control processor on the SDV to direct SDV vehicular physical control mechanisms on the SDV to adjust the current speed and direction of movement of the SDV, thereby reducing a likelihood of the SDV striking the animal;

predicting, based on the predicted direction and speed of movement of the animal, a length of time that the animal will block a pathway of the SDV; and in response to the predicted length of time exceeding a predetermined value, stopping, by the SDV on-board computer, the SDV and turning off, by the SDV on-board computer, an engine in the SDV.

15. The system of claim 14, wherein the SDV is a first SDV, wherein the first SDV blocks a field of view of a second SDV such that a camera in the second SDV is unable to detect the animal, and wherein the method further comprises:

transmitting, from the SDV on-board computer in the first SDV to an SDV on-board computer in the second SDV, the image of the animal that the camera on the first SDV captured.

16. The system of claim 14, wherein the SDV is a first SDV, wherein the first SDV blocks a field of view of a second SDV such that a camera in the second SDV is unable to detect the animal, and wherein the method further comprises:

transmitting, from the SDV on-board computer in the first SDV to an SDV on-board computer in the second SDV, the predicted direction and speed of movement of the animal that was created by the SDV on-board computer in the first SDV.

17. The system of claim 14, wherein the SDV is a first SDV, wherein the first SDV leads a second SDV, and wherein the method further comprises:

generating, by the SDV on-board computer on the first SDV, a recommended navigation plan to avoid striking the animal; and transmitting, from the SDV on-board computer on first SDV to an SDV on-board computer on the second SDV, instructions to move the second SDV to a position that is within a predetermined distance from the first SDV and to follow the recommended navigation plan along with the first SDV.

\* \* \* \* \*